(12) United States Patent
Hozumi et al.

(10) Patent No.: US 8,375,515 B2
(45) Date of Patent: Feb. 19, 2013

(54) CASTER

(75) Inventors: Mitsunobu Hozumi, Hyogo (JP); Ryo Shimizu, Osaka (JP)

(73) Assignee: Hammer Caster Co., Ltd., Osaka (JP)

(*) Notice: Subject to any disclaimer, the term of this patent is extended or adjusted under 35 U.S.C. 154(b) by 95 days.

(21) Appl. No.: 13/152,327

(22) Filed: Jun. 3, 2011

(65) Prior Publication Data

US 2011/0296649 A1    Dec. 8, 2011

(30) Foreign Application Priority Data

Jun. 3, 2010  (JP) ................................. 2010-128080

(51) Int. Cl.
*A47B 91/06* (2006.01)
*B60B 33/00* (2006.01)

(52) U.S. Cl. ............................................. 16/47; 16/45

(58) Field of Classification Search .......... 16/45, 46, 16/47, 25, 36, 48; 248/346.11; 301/5.1, 301/5.307, 5.309, 63.109, 64.701, 64.702, 301/64.703, 105.1
See application file for complete search history.

(56) References Cited

U.S. PATENT DOCUMENTS

| | | | | |
|---|---|---|---|---|
| 3,977,040 A * | 8/1976 | Sugasawara | ....................... | 16/45 |
| 4,074,407 A * | 2/1978 | Christensen | .................... | 29/894 |
| 5,056,938 A * | 10/1991 | Ahlman et al. | ............... | 384/286 |
| 5,219,232 A * | 6/1993 | Adams et al. | ................. | 384/275 |
| 5,732,441 A * | 3/1998 | Janian | ................................ | 16/45 |
| 6,748,623 B1 * | 6/2004 | Tsai | .................................... | 16/47 |
| 6,839,939 B2 * | 1/2005 | Donakowski | ...................... | 16/45 |
| 2002/0178539 A1* | 12/2002 | Donakowski | ................. | 16/18 R |
| 2005/0081329 A1* | 4/2005 | Tsai | ................................. | 16/18 R |
| 2007/0143958 A1* | 6/2007 | Trivini | .............................. | 16/45 |
| 2007/0186373 A1* | 8/2007 | Melara | .......................... | 16/35 R |
| 2008/0163455 A1* | 7/2008 | Tsai | .................................. | 16/46 |
| 2010/0306962 A1* | 12/2010 | Breyer et al. | ..................... | 16/46 |

FOREIGN PATENT DOCUMENTS

| | | |
|---|---|---|
| JP | H5-86002 | 11/1993 |
| JP | 2008-526603 | 7/2008 |

* cited by examiner

*Primary Examiner* — Chuck Y. Mah
(74) *Attorney, Agent, or Firm* — Heslin Rothenberg Farley & Mesiti P.C.

(57) ABSTRACT

A caster has a ring-shaped main body, two ring-shaped wheels provided on both side end parts of the main body and two ring-shaped holders by which the two ring-shaped wheels are rotatably fitted on the main body. Each of the wheels has a first sliding face on an inner side of an inner circumferential part and a second sliding face on an outer side thereof. A first dry bearing is provided between an outer circumferential face of a ring-shaped flange provided on each of the both side end parts of the main body and the first sliding face, a second dry bearing is provided between an outer circumferential face of a ring-shaped flange provided on an outer end part of each of the holders and the second sliding face. The caster provides a high mechanical stability, durability, impact resistance and heat resistance.

15 Claims, 10 Drawing Sheets

PRIOR ART

FIG. 8

PRIOR ART

FIG. 9

PRIOR ART

FIG. 10

PRIOR ART

FIG. 11

CASTER

CROSS REFERENCE TO RELATED APPLICATIONS

This application claims priority of Japanese application No. 2010-128080 filed on Jun. 3, 2010, the entire disclosure of this application being hereby incorporated herein by reference.

FIELD OF THE INVENTION

The present invention relates to a caster which is mounted on such as shopping carts used in super markets, furniture such as chairs and tables, carriages such as baby strollers, wheel chairs and the like.

BACKGROUND OF THE INVENTION

Figure 8:
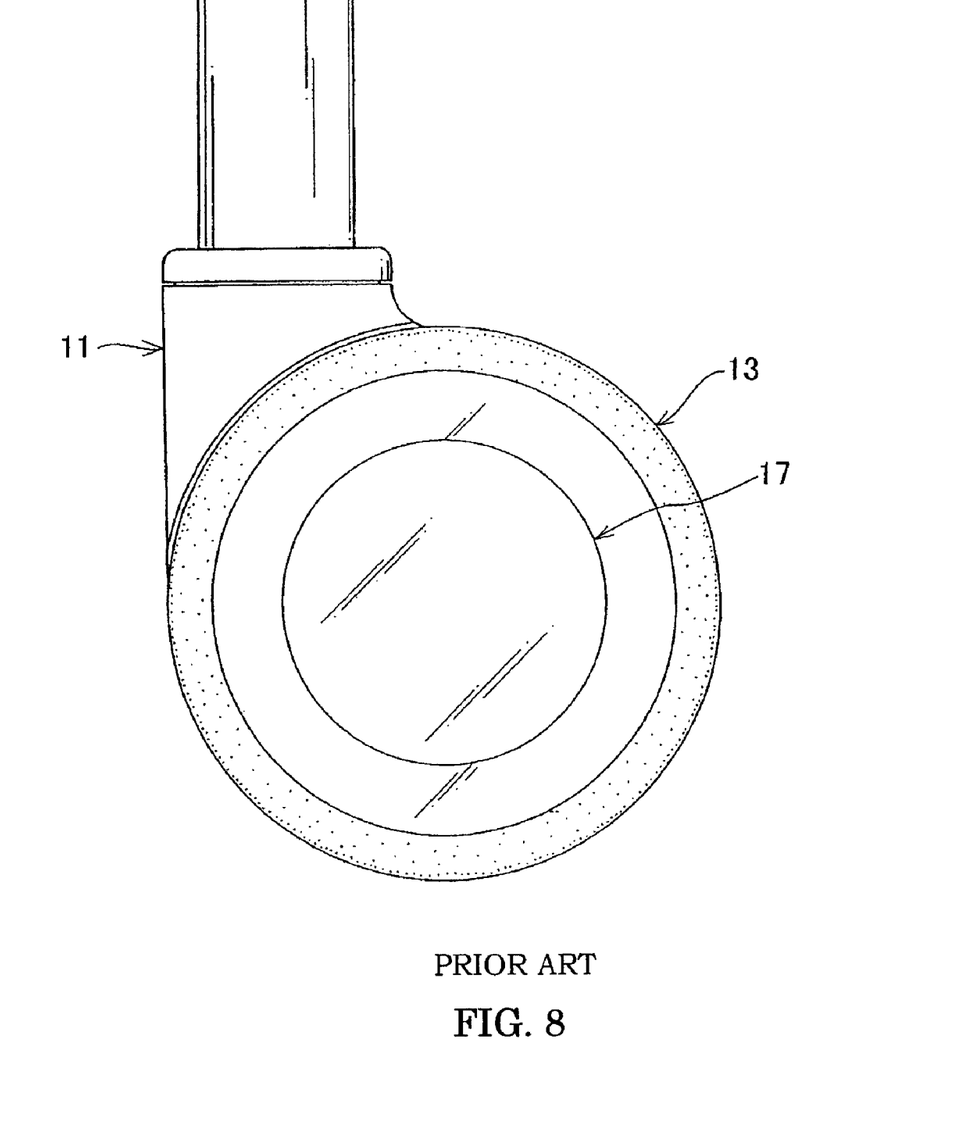
FIG. 8 is a side view of an example of a conventional caster.
Figure 9:
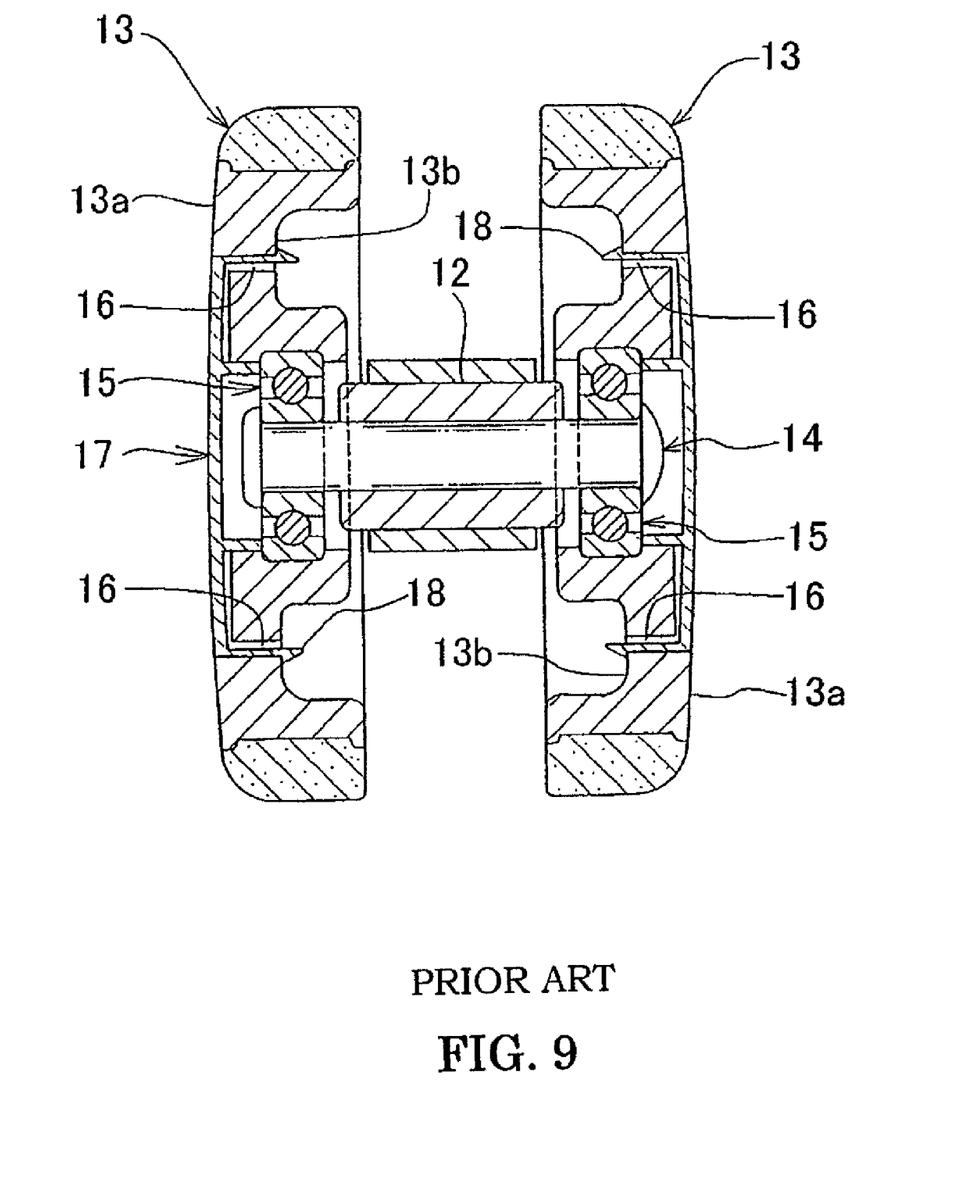
FIG. 9 is a central sectional view of the conventional caster in FIG. 8.

With respect to this type of caster, there is a conventional caster as shown in FIGS. 8 and 9, which includes double-wheels. A main body 11 has an axial bore 12 at a lower part thereof into which a wheel axis 14 for wheels 13 is inserted. The wheel axis 14 is supported by ball bearings 15 provided on the wheels 13 so as to rotatably mount the double wheels 13 on both sides of the main body 11.

In the above double-wheel caster, the wheel axis 14 is in general a bolt. Both end parts of the bolt, namely a head part and an axis end, are exposed in the central parts of the wheels. Furthermore parts of the ball bearings 15 which pivotally support the wheel axis 14 are exposed at the central parts of the wheels 13. They deteriorate the appearance of the caster.

For that, in the double-wheel caster, as shown in the drawings, a stopper 18 of a cover 17 is engaged with an engaging hole 16 passing through from an exterior face 13a to an interior face 13b of each of the wheels 13, and thus the cover 17 is attached to the exterior face 13a of the wheel 13 and covers the both end parts and the ball bearings 15 exposed in the central part of the wheel 13. An example of such a caster is described in the Japanese Utility Model Application, Laid Open No. H5-86602.

When the foregoing caster is mounted on a shopping cart, furniture and other carriage, the load thereof is applied on the wheel axis 14. A large load would necessitate a strong and thick wheel axis and this consequently necessitates bigger ball bearings 15, which inevitably enlarges the exposed amount and further worsens the appearance of the caster. Even though the cover 17 is used to hide the both end parts of the wheel axis 14 and ball bearings 15, which just does not worsen the appearance only, but not improve it.

Recently in order to improve appearance of a double-wheel caster, there is an idea to eliminate a wheel axis and provide a large opening at the central part of a wheel. When light passes through the opening, the wheel becomes less showy, by which a member on which a caster is mounted, such as a shopping cart, furniture and carriage, appears "being floating." This double-wheel caster, for example shown in FIGS. 10 and 11, includes a ring body 21 and ring shaped wheels 22 which are rotatably mounted on the ring body 21.

Figure 10:
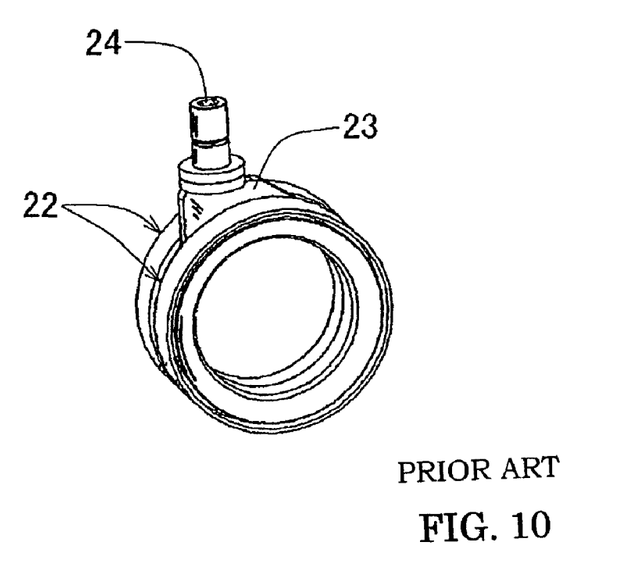
FIG. 10 is a perspective view of another example of a conventional caster.
Figure 11:
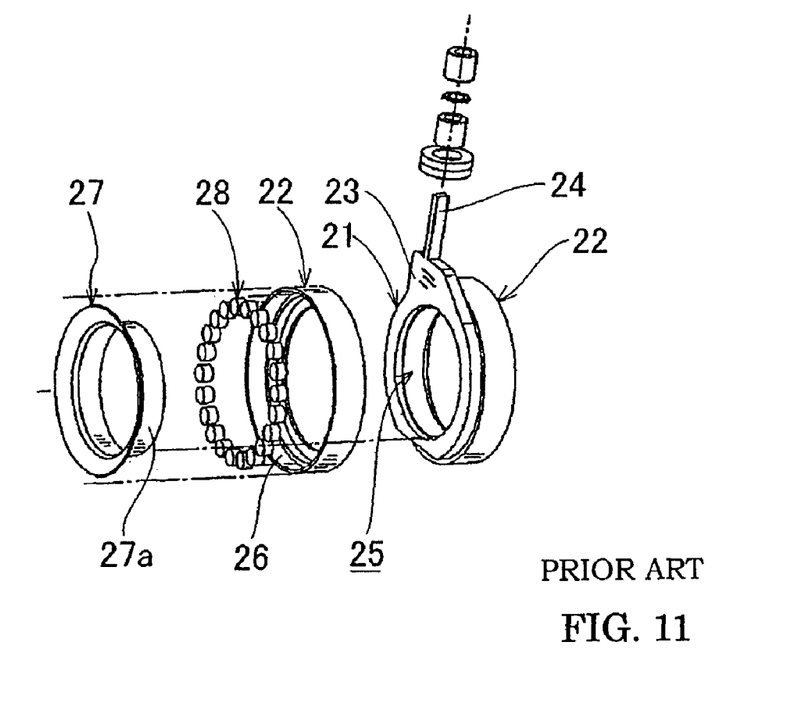
FIG. 11 is a partially exploded perspective view of the conventional caster in FIG. 10.

The ring body 21 has, on its outer circumference, a boss 23 outwardly provided as one body and a support pin 24 provided on the boss. The support pin is used to be mounted on a shopping cart, furniture and other carriage. The body 21 has a central opening part 25 with a large diameter.

The ring shaped wheel 22 has an inner circumferential flange 26. Plural roller bearings 28 are disposed between the inner circumferential flange 26 and a neck part 27a of an annular holder 27. A circumferential end of the neck part 27a of the holder 27 is fixed within the opened central part 25 so that the ring shaped wheel 22 is rotatably attached to the ring body 21. This example is described in Japanese Patent Application, Laid Open No. 2008-526603.

However, the conventional double-wheel casters stated above employ ball bearings 15 or roller bearings 28, and in either case rolling bearings are employed. Rolling bearings provide lower mechanical stability. For the long term use, general maintenance such as oiling is necessary and handling is cumbersome.

Furthermore, in the above conventional double-wheel casters, the used rolling bearings lack of impact-resistance and heat resistance. Therefore if the casters are used under an environment where impact is easily applied or under high temperatures, the casters are unlikely to withstand the usage thereunder.

In addition, the employed rolling bearings in the foregoing double-wheel casters have a large volume, and the casters with these rolling bearings become large in volume. Therefore it is difficult to make them smaller and lighter.

It is hence an object of the present invention to solve the above conventional problems and to provide a caster which has a high mechanical stability, durability, impact resistance and heat resistance, requires no maintenance, withstands the use under environment where impact is readily applied and/or under high temperatures, and furthermore can be readily reduced in size and weight.

A caster according to the present invention includes a ring-shaped main body, two ring-shaped wheels provided on both side end parts of the main body, and two ring-shaped holders by which the two ring-shaped wheels are rotatably fitted on the main body. Each of the wheels has a first sliding face on an inner side of an inner circumferential part and a second sliding face on an outer side thereof. A first dry bearing is provided between an outer circumferential face of a ring-shaped flange provided on each of the both side end parts of the main body and the first sliding face. A second dry bearing is provided between an outer circumferential face of a ring-shaped flange provided on an outer end part of each of the holders and the second sliding face).

In the caster according to the present invention, the holders have respective connecting parts on their inner circumferential end parts, and the connecting parts are linked with each other in an inner circumferential part of the main body.

In the caster according to the present invention, the holders may have respective connecting parts on their inner circumferential end parts, and the connecting parts are respectively fixed on an inner circumferential part of the main body.

In the caster according to the present invention, at least one of the dry bearings is formed in a ring-shape.

In the caster according to the present invention, at least one of the dry bearings may be formed in a ring-shape with a cut.

In the caster according to the present invention, at least one of the dry bearings may have plural segments which form a ring-shape.

In the caster according to the present invention, at least one of the dry bearings may be formed in a semi-ring shape.

Constituted as above, the caster according to the present invention has a high mechanical stability, durability, impact resistance and heat resistance, requires no maintenance, withstands the use under environment where impact is readily applied and/or under high temperatures, and furthermore can be readily reduced in size and weight.

DETAILED DESCRIPTION OF THE PREFERRED EMBODIMENTS

Embodiments according to the present invention are described in details below in conjunction with the drawings.

Figure 1:
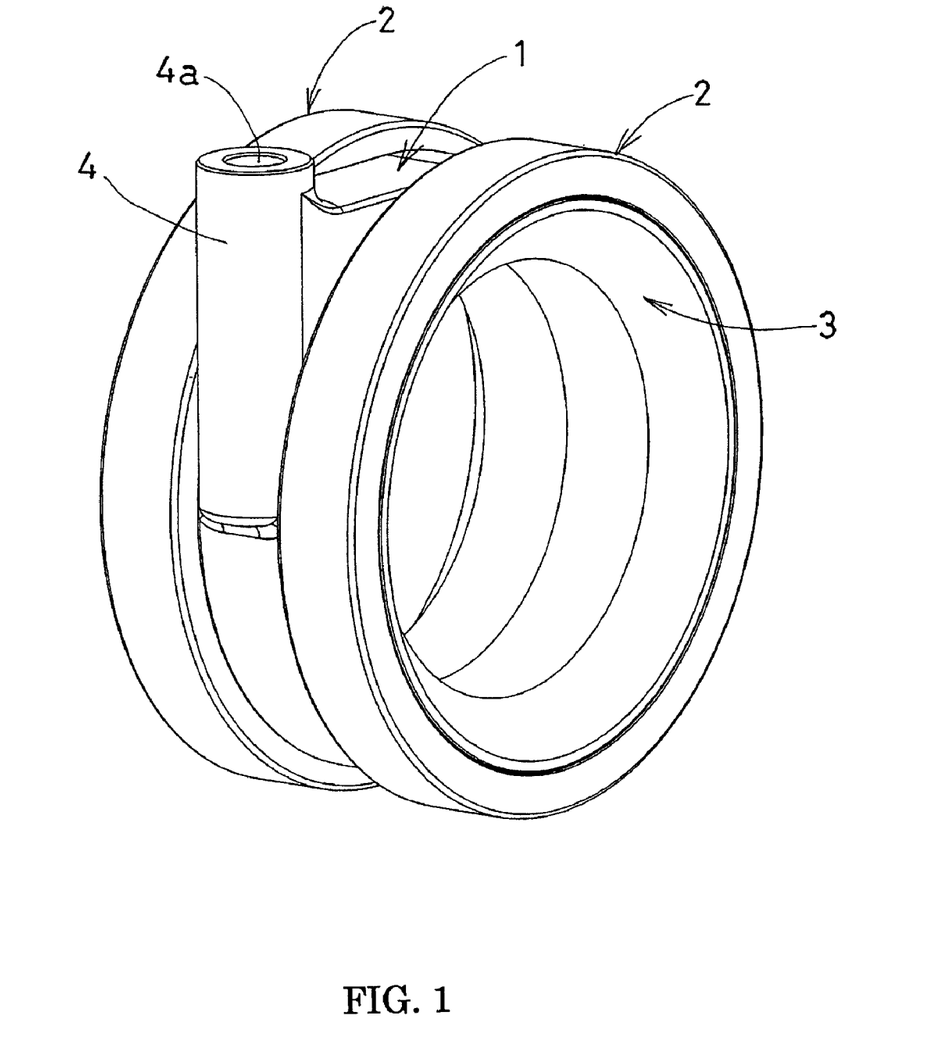
FIG. 1 is a perspective view of an embodiment of a caster according to the present invention.
Figure 2:
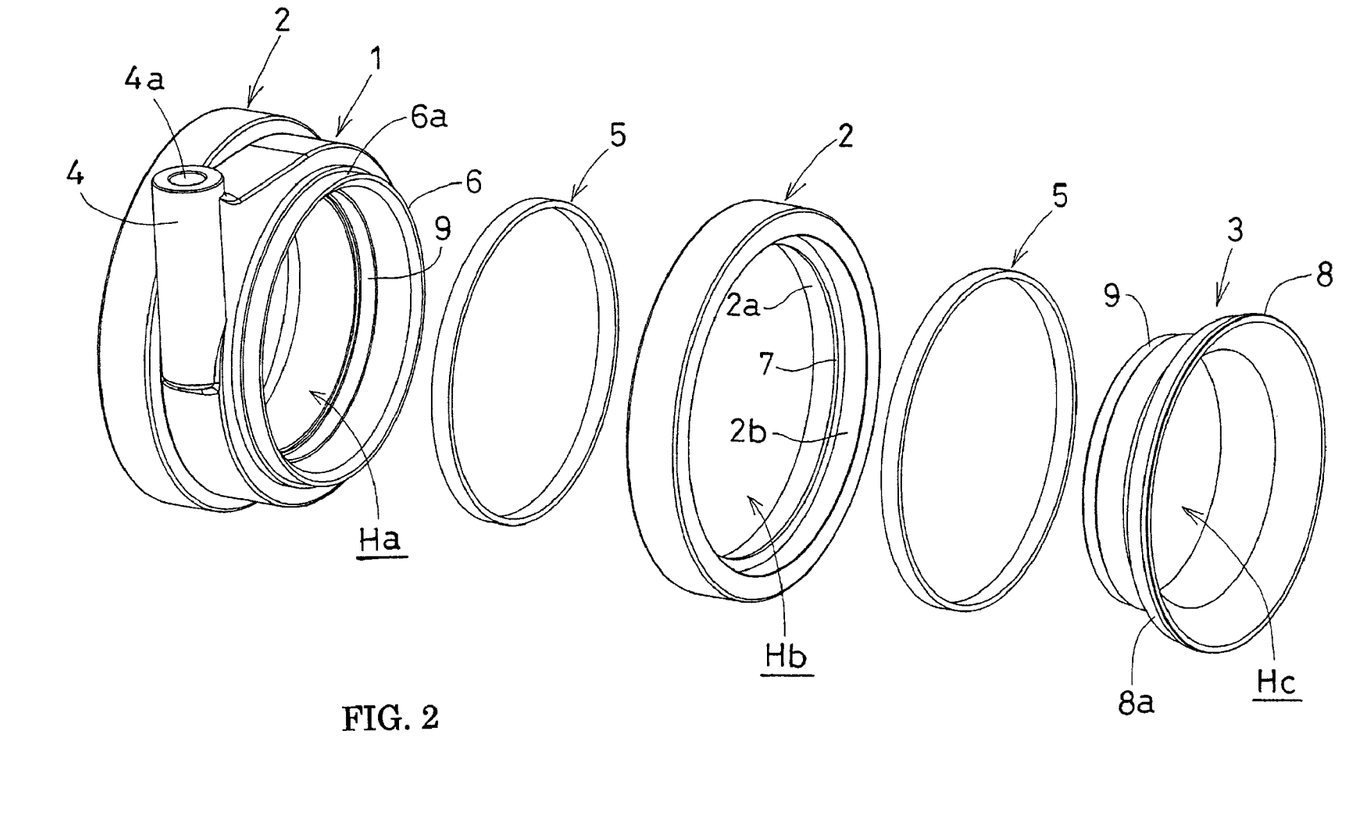
FIG. 2 is a partially exploded perspective view of the caster in FIG. 1 according to the present invention.
Figure 3:
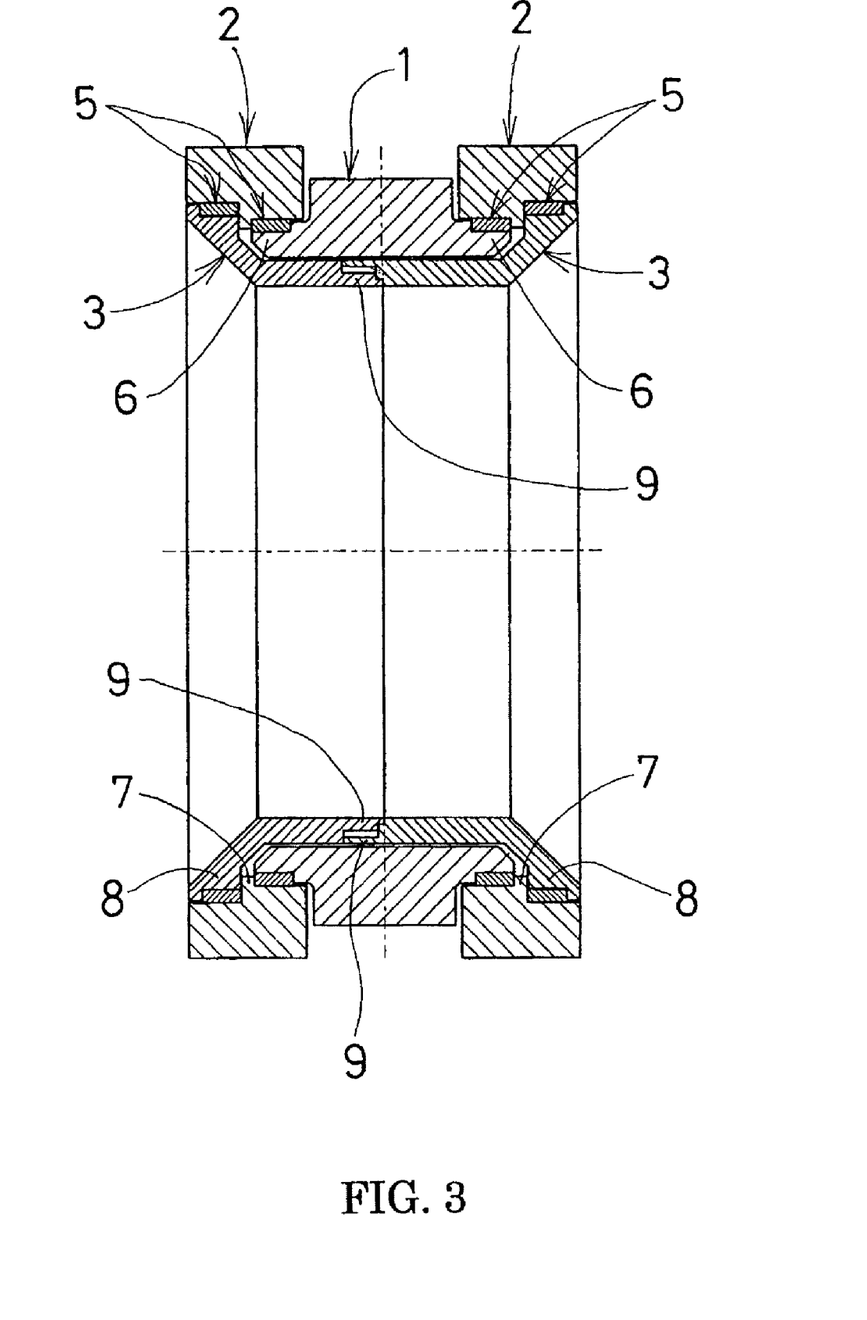
FIG. 3 is a central sectional view of the caster in FIG. 1 according to the present invention.

A caster according to the present invention can be carried out as either a double-wheel caster or a single-wheel cater. When carrying out the invention as a double-wheel cater, as shown in FIGS. 1 to 3, respectively ring-shaped wheels 2 are provided on both side end parts of a ring shaped body 1 rotatably by respectively ring-shaped holders 3.

The body 1 has a largely opened central part Ha (i.e. a central opening part Ha with a large opening diameter). On an outer circumference, a fitting member 4 such as a boss is protruded outwardly as a one body. This fitting member 4 has a insertion hole 4a which receives a support pin (not shown) provided on an article on which the caster is mounted. Examples of the article are a shopping cart, furniture and other carriage. Furthermore the both side end parts are provided with ring-shaped flanges 6.

Each of the wheels 2 has a central opening part Hb which has a larger opening diameter than the central opening part Ha of the main body 1 does. The wheel 2 has a ring-shaped protruded partition 7 at a substantially central part of the inner circumference. An inner side of the partition 7 is a first ring-shaped sliding face 2a, while an outer side thereof is a second ring-shaped sliding face 2b. Between the sliding face 2a and the outer circumferential face 6a of the flange 6 of the main body is provided with a first ring-shaped dry bearing 5.

The respective holders 3 have a central opening part Hc which has a smaller opening diameter than the central opening part Ha of the main body does. The respective holders have a ring-shaped flange 8 at an outer end part and a ring-shaped connecting part 9 at an inner end part. Between an outer circumferential face 8a of the flange 8 of the holder 3 and the sliding face 2b of the wheel 2 is provided a second dry bearing 5. In the inner circumferential part of the main body 1, the connecting parts 9 of the holders 3 are linked with each other. Or the connecting parts 9 are respectively fixed on the inner circumferential part of the main body 1. The connecting parts 9 can be linked with each other by screw-in method, insert-in method or the like. On the other hand, the connecting parts 9 can be fixed on the inner circumferential part of the main body 1 by compressing method, adhering method or the like.

Figure 4:
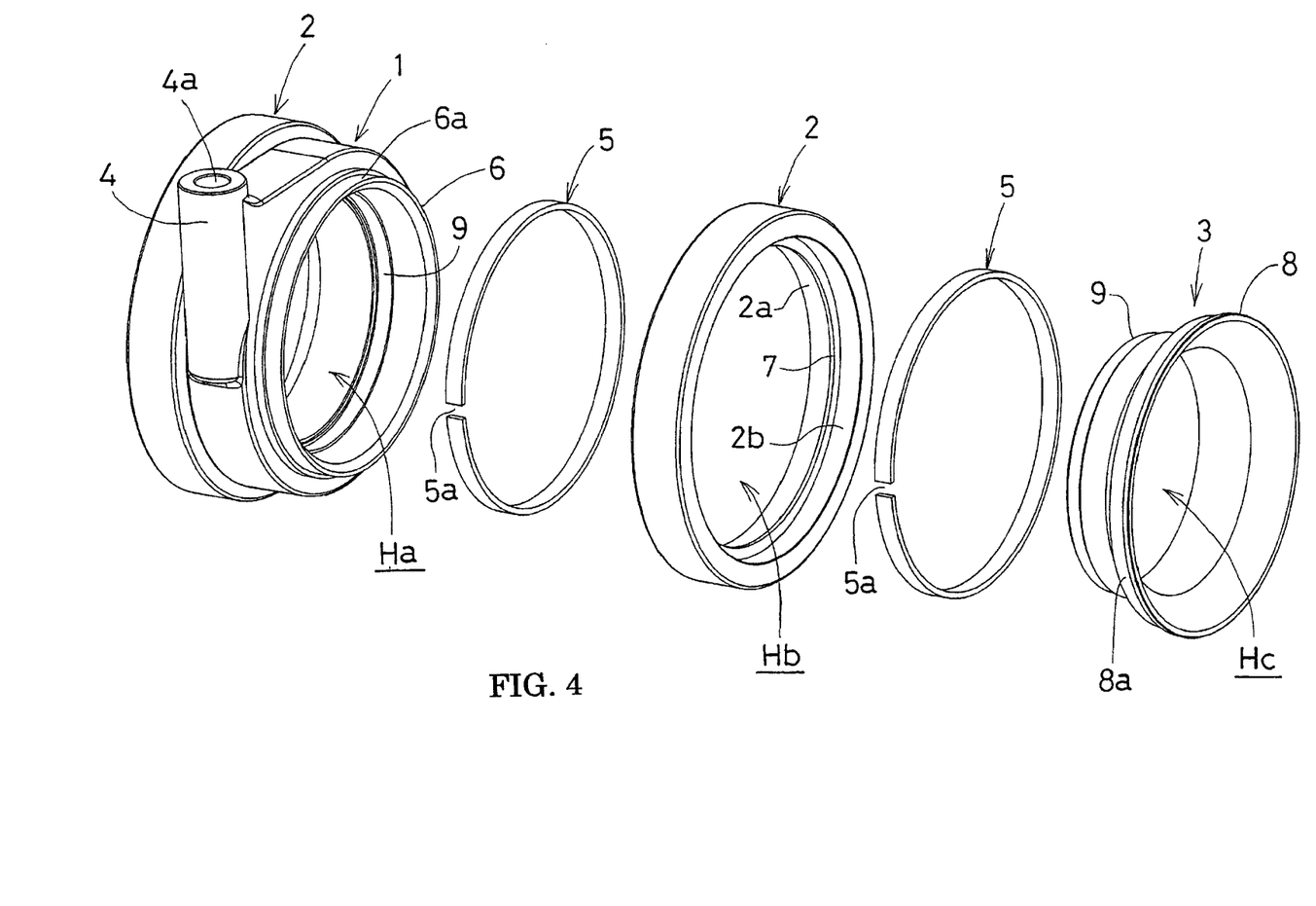
FIG. 4 is a partially exploded perspective view of another embodiment of a caster according to the present invention.
Figure 5:
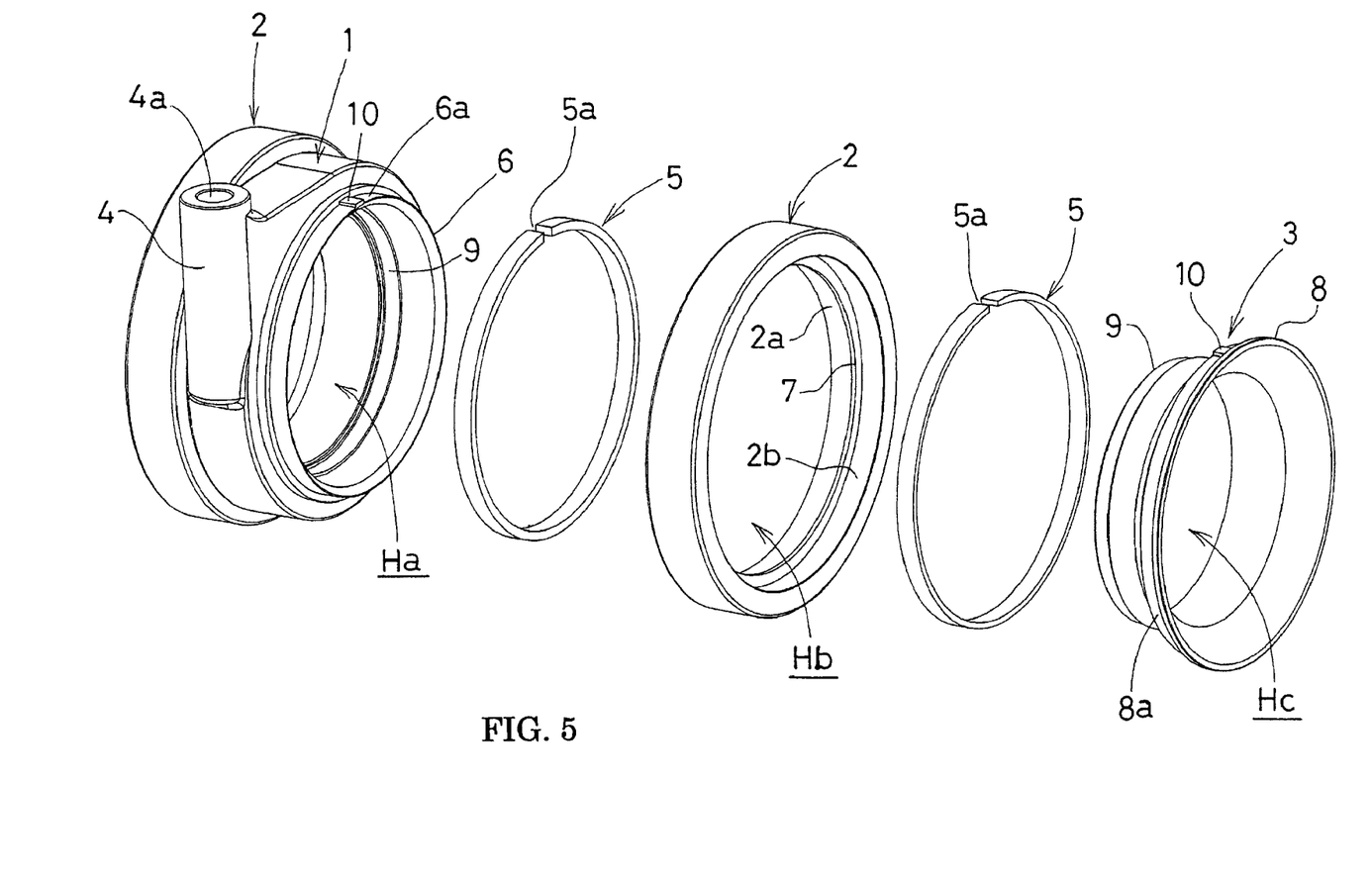
FIG. 5 is a partially exploded perspective view of another embodiment of a caster according to the present invention.
Figure 6:
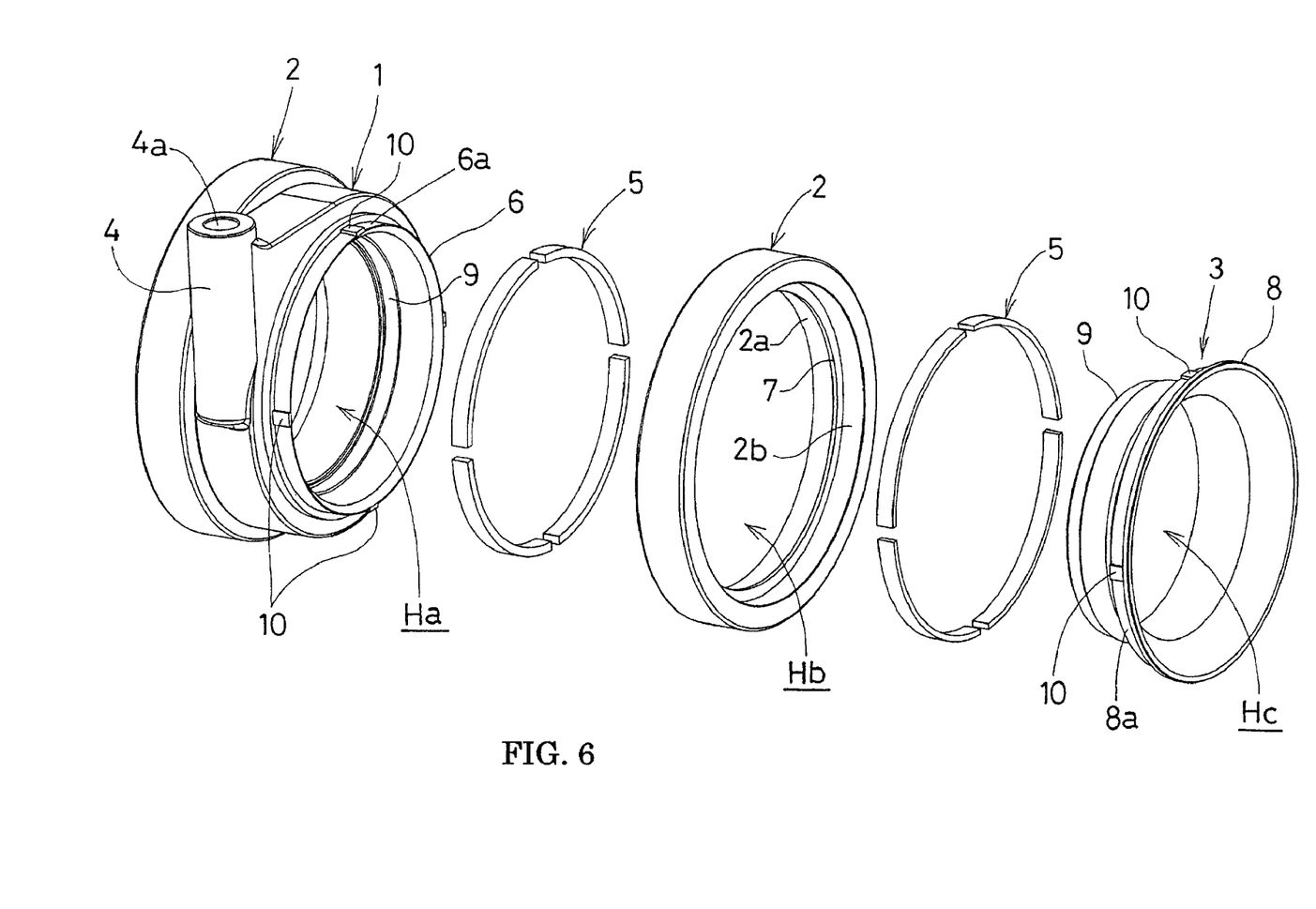
FIG. 6 is a partially exploded perspective view of another embodiment of a caster according to the present invention.
Figure 7:
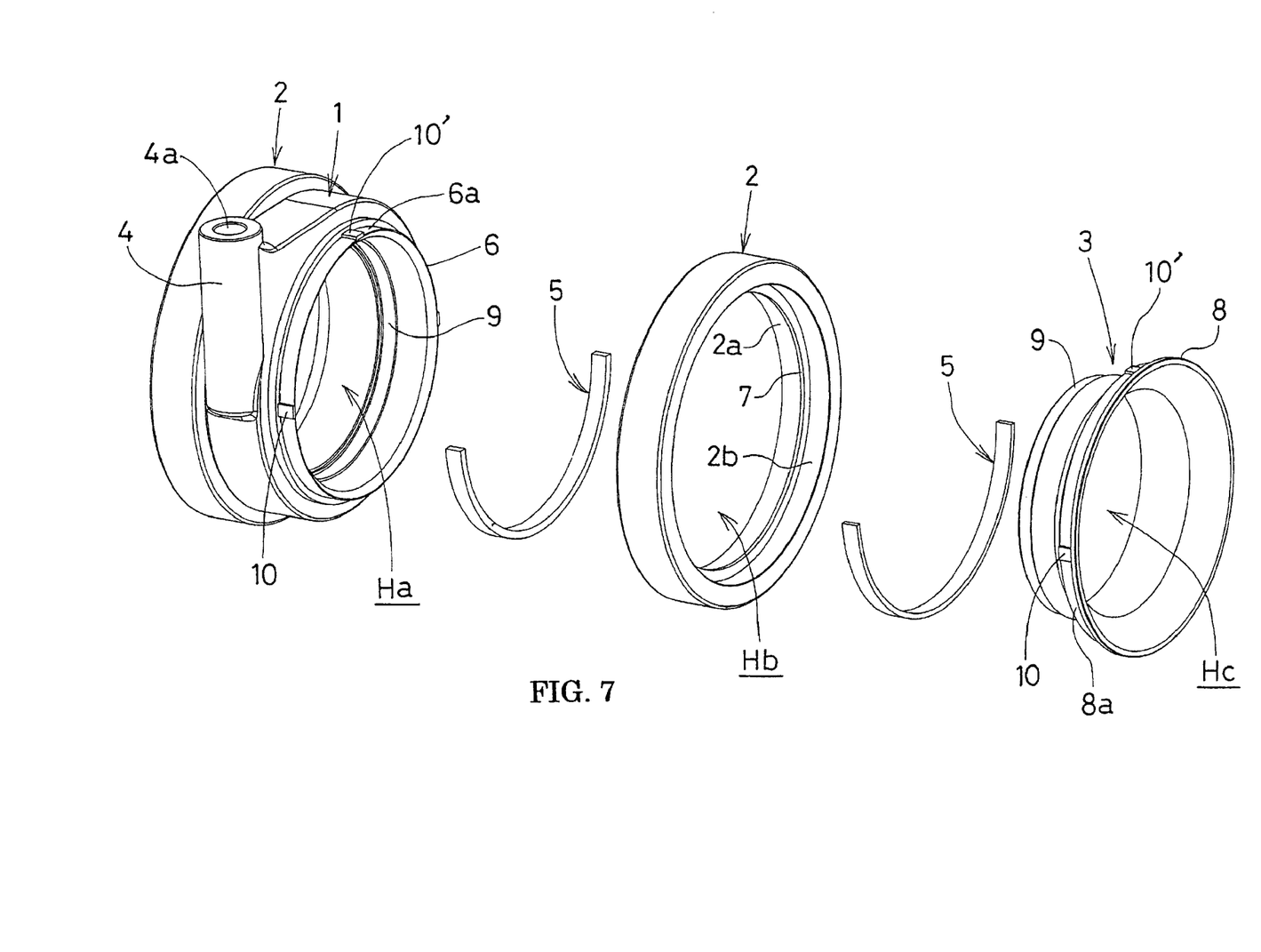
FIG. 7 is a partially exploded perspective view of another embodiment of a caster according to the present invention.

The dry bearings 5 in the drawings are shaped in a ring, but not limitative thereto. As shown in FIG. 2, the bearing 5 may have no cut, as shown in FIGS. 4 and 5, the bearing 5 may have one cut 5a, as shown in FIG. 6, the bearing 5 may have plural segments of which a ring consists, or as shown in FIG. 7, the bearing 5 may be formed in a semi-ring shape. Dry bearings 5 as constituted as above have a much smaller volume compared with rolling bearings. If a dry bearing 5 is formed into a ring shape with one cut 5a, consists of plural segments which form a ring shape or is formed into a semi-ring shape, protrusion 10 for positioning of the dry bearings 5 may be provided on the outer circumferential face 6a of the flange 6 of the main body and/or the outer circumferential face 8a of the flange 8 of the holder 3, so that the dry bearings 5 can be prevented from moving off their predetermined positions, and maintain the stable slidability. If a dry bearing 5 is shaped in a semi-ring shape, in addition to the protrusion 10 for positioning, another protrusion 10' may be provided in order to prevent dislocation and shaking of the wheel 2.

There are metallic dry bearings, plastic dry bearings, layered bearing and the like. As metallic bearings, sintered articles and casted articles are available, while as plastic bearings, thermoplastic resin articles, thermosetting resin articles are available, and any of them can be employed. As an example of layered bearings, metallic powder is sintered to a metallic plate having high strength to produce a porous metallic layer, the porous metallic layer is impregnated with sliding material to produce a layered material, and this material is used in a way that the sliding material is present on the outer side. As the metallic plate, a iron plate or an aluminum plate can be used, as metallic powder, copper alloy or aluminum alloy can be used, as sliding material, a mixture of polymer resin such as polytetrafluoroethylene resin and solid lubricant such as lead powder and molybdenum disulfide which have a high speed resistant property and a heavy load resistant property.

Therefore, the dry bearing 5 itself has a high lubricant property and require no oiling at all, so that it can be used without oiling. Even a plastic bearing, in the application to the present invention, has a sufficient durability, impact resistance, and heat resistance. Furthermore, in the caster of the present invention, since two of the foregoing bearings 5 are employed at one side, durability, impact resistance and hear resistance are more enhanced.

In carrying out the present invention as a single wheel caster, although not shown in the drawings, one side end part of the ring-shaped main body 1 may be provided with a ring-shaped wheel 2 ratably by the ring-shaped holder 3.

In the caster according to the present invention, the one side end part of the main body 1 is provided with a ring-shaped flange 6. Between the inner sliding face 2a on the inner circumferential part of the wheel 2 and the outer circumferential face 6a of the flange 6 of the main body 1 is provided a first ring-shaped dry bearing 5. Between the outer circumferential face 8a of the ring-shaped flange 8 provided on the outer end part of the holder 3 and the sliding face 2b of the wheel 2 is provided the second ring-shaped dry bearing 5. The connecting part 9 provided on the inner circumferential part of the holder 3 is fixed on the inner circumferential part of the main body 1. The one side part of the main body 1 is provided with the wheel 2 rotatably by the holder 3.

Therefore, the caster constituted as stated above provided a high mechanical stability, durability, impact resistance and heat resistance. It necessitates no maintenance. It withstands the use under the environment where impact is readily applied and under high temperatures. It can be easily downsized and lightened.

What is claimed is:

1. A caster comprising:
a ring-shaped main body;
two ring-shaped wheels respectively provided on both side end parts of the main body;
two ring-shaped holders by which the two ring-shaped wheels are rotatably fitted on the main body;
wherein each of the wheels has a first sliding face on an inner side of an inner circumferential part and a second sliding face on an outer side of the inner circumferential part,
a first dry bearing is provided between an outer circumferential face of a ring-shaped flange provided on each of the both side end parts of the main body and the first sliding face,
a second dry bearing is provided between an outer circumferential face of a ring-shaped flange provided on an outer end part of each of the holders and the second sliding face.

2. The caster according to claim 1, wherein the holders have respective connecting parts on their inner circumferential end parts, and the connecting parts are linked with each other in an inner circumferential part of the main body.

3. The caster according to claim 2, wherein at least one of the dry bearings is formed in a ring-shape.

4. The caster according to claim 2, wherein at least one of the dry bearings is formed in a ring-shape with a cut.

5. The caster according to claim 2, wherein at least one of the dry bearings has plural segments which form a ring-shape.

6. The caster according to claim 2, wherein at least one of the dry bearings is formed in a semi-ring shape.

7. The caster according to claim 1, wherein the holders have respective connecting parts on their inner circumferential end parts, and the connecting parts are respectively fixed on an inner circumferential part of the main body.

8. The caster according to claim 7, wherein at least one of the dry bearings is formed in a ring-shape.

9. The caster according to claim 7, wherein at least one of the dry bearings is formed in a ring-shape with a cut.

10. The caster according to claim 7, wherein at least one of the dry bearings has plural segments which form a ring-shape.

11. The caster according to claim 7, wherein at least one of the dry bearings is formed in a semi-ring shape.

12. The caster according to claim 1, wherein at least one of the dry bearings is formed in a ring-shape.

13. The caster according to claim 1, wherein at least one of the dry bearings is formed in a ring-shape with a cut.

14. The caster according to claim 1, wherein at least one of the dry bearings has plural segments which form a ring-shape.

15. The caster according to claim 1, wherein at least one of the dry bearings is formed in a semi-ring shape.

* * * * *